Jan. 21, 1930.   H. C. PIERLE   1,744,241
WHEEL BRAKE
Filed Jan. 30, 1925
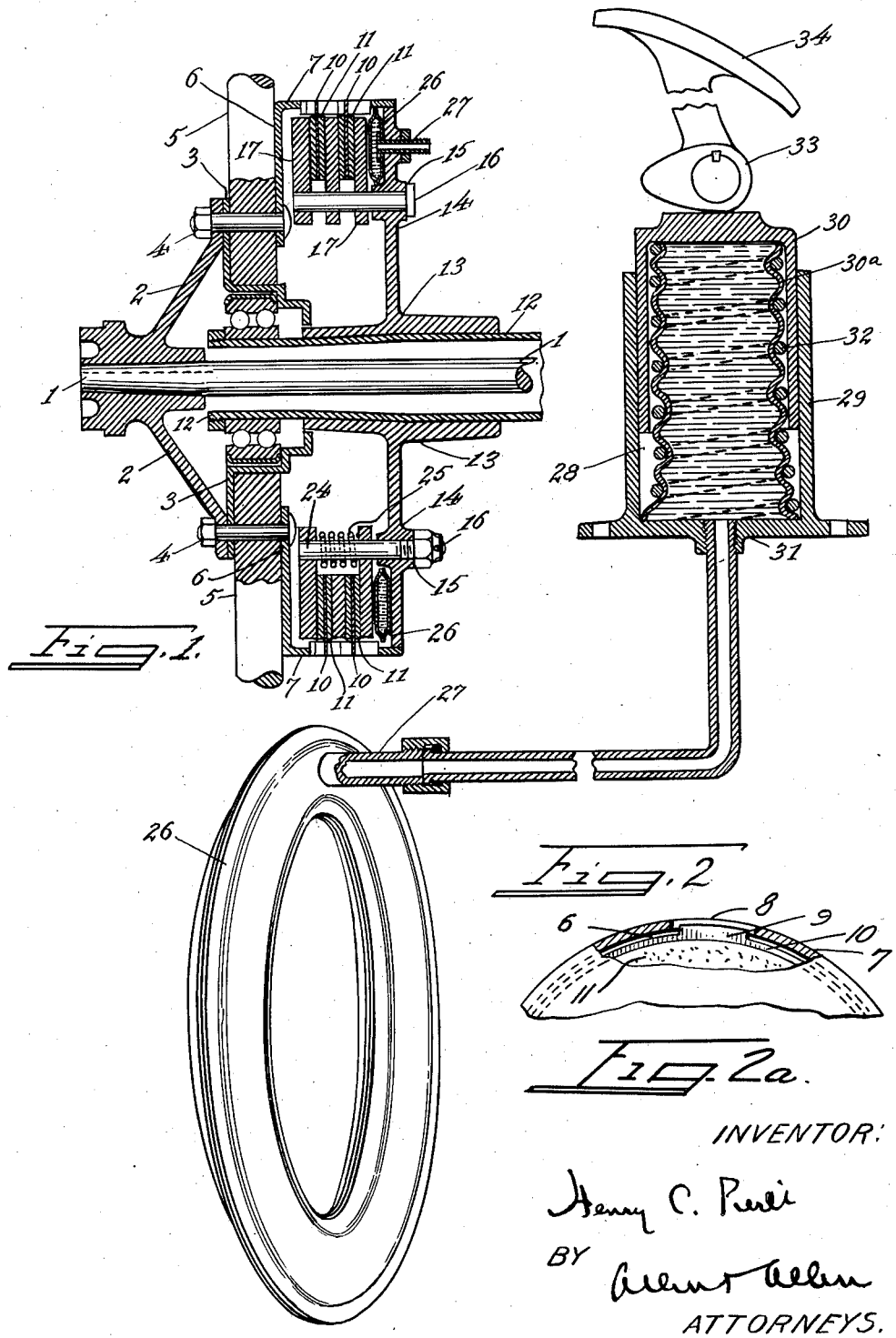
INVENTOR:
Henry C. Pierle
BY
Allen & Allen
ATTORNEYS.

Patented Jan. 21, 1930

1,744,241

UNITED STATES PATENT OFFICE

HENRY C. PIERLE, OF CINCINNATI, OHIO

WHEEL BRAKE

Application filed January 30, 1925. Serial No. 5,734.

My invention relates to wheel brakes in general and more particularly to wheel brakes in which the retarding action is applied at the hub of the wheel.

It is the object of my invention as described in the particular construction illustrated, to provide for the carrying wheels of a vehicle, a plurality of discs faced with brake lining and supported by extended members of the wheel, and to cause the frictional engagement of these brake lined faces with movable plates mounted in alignment therewith by various novel means as will be hereinafter described. The construction is simple to install, very accessible for replacement of worn parts, and by its use a very positive cumulative retarding effect may be had. In stopping a vehicle with the brakes of my construction there is no jerk caused by unequal frictional engagement of braking surfaces.

Referring to the drawings in which illustration has been made of the invention as applied to a selected number of the wheels on a motor vehicle: Figure 1 is a vertical section with a hydraulic diaphragm causing the engagement of the friction discs. Figure 2 is a vertical section of a sylphon bellows type hydraulic pressure device with a perspective view of the diaphragm which causes the brake engagement.

Fig. 2ª is a partial side elevation with the brake casing broken away to show the brake discs.

It should be noted that although the description herein is of the application of my invention to a wheel of a motor vehicle, it is equally adaptable for use on any of the carrying wheels of any vehicle as the parts used in the construction and operating mechanism are independent of the motive power by which the vehicle may be moved.

In the drawings the axle of the vehicle on which the wheel is mounted is generally indicated at 1. The outer hub portion 2 drives the wheel body 3, which in the illustration shown is attached thereto by bolts 4. The wheel shown is of the spoke type with the spokes shown at 5. Attached to the inner portion of the wheel body is a circular flanged housing member 6 which has the general appearance of a brake drum. The circular flanged portion 7 of this plate has slots 8 cut therein, which are shaped to engage slidably, lugs 9 on friction discs 10. These friction discs are annular in shape and have their faces on each side lined with pieces of brake lining 11.

Surrounding the axle housing 12 another plate-like circular member 13 is disposed to cover the open side of the drum shaped brake housing. This circular plate has at regular intevals bosses 14 which retain the studs 16. These studs extend into the housing and retain slidably the annular plates 17 which are disposed in interspaced relation between the brake lined discs with their faces in alignment with the brake lined surfaces thereof. The plate nearest the wheel and between the innermost friction disc and the wheel, has threaded holes 18 in it into which the ends of the studs 16 are screwed. The outer annular plate 17 has holes for the studs and the middle plate 17 has in the illustrated example, three holes for the studs and three clearance notches 24. Any movement of the assembly of plates and discs inwardly against the stationary inner plate will cause their frictional engagement and the consequent braking effect on the wheel.

A suitable method of controlling the brake is by hydraulic pressure. This method is distinctly preferable in four wheeled brake installation because if all the brakes are operated from the same hydraulic system, the pressure equalizes and causes the same frictional engagement of all the brakes at the same time. This method is shown in the drawings in Figures 5, 6, in which a diaphragm 26 is located in the aperture between the outer plate 17 and the mounting plate 13 thereon replacing the plate 19 with the cam faced lugs on it. The diaphragm is preferably of copper or other resilient material and has a hollow interior which causes the sides to bulge out with pressure applied inwardly. A nipple 27 connected with this diaphragm in any suitable manner leads to a sylphon bellows hydraulic tank or device 28. This tank has an oil tight cylindrical open topped shell portion 29, and a cooperating inverted telescoping shell portion 30 slides within its walls. A liquid container vessel 30ª in the form of a sylphon bellows is disposed within the telescoping shells or casings, and is connected with a threaded opening 31 on the bottom of the tank. A very strong spring 32 surrounds the flutes in the walls of the container and exerts upward pressure on the top of the inner shell portion 30, so that with the release of downward pressure as applied by the cam 33 from the foot pedal 34, the hydraulic pressure within the tank is released. The operation of the hydraulic means will be at once apparent from the drawings. Downward pressure on the foot pedal causes hydraulic pressure within the liquid container which passes through pipes to the diaphragms mounted in position to press together the brake assembly discs and plates and retards the rotation of the wheel. Release of the pressure causes the contraction of the diaphragm and the plates and discs disengage and the springs cause perfect clearance of the engagement surfaces of the brakes.

While it is my object to claim as my invention the particular construction of the hydraulic device which to the best of my knowledge has never been used to induce brake pressure before, I do not wish thereby to be limited to the pedal construction illustrated, as many forms of levers and cooperating mechanical devices will readily occur to those skilled in the art to cause the compression of the shells of the hydraulic tank. Furthermore, I have described a rear axle mounting of the parts, from which front axle mountings can easily be designed.

Having thus described the invention which it is my desire to secure by Letters Patent, what I claim is:—

In a brake for the wheel of a vehicle in combination with the hub and a frame part, a brake housing retained on the hub, a plurality of frictional brake lined discs with lugs thereon disposed in grooves on the flanged portion of said brake housing, with the lugs retained slidably in said brake housing, an extended member on said frame part, bolts in holes in bosses on said extended member, said bolts supporting plates interspaced between said friction brake lined discs and a resilient diaphragm disposed in proximity to an outer face of one of said plates to move said plates into closer than normal interspaced relation to frictionally engage said friction discs and retard the rotation of the wheel, and means for inducing hydraulic pressure in said diaphragm, said diaphragm having an annular shape, and being mounted coaxially with the axes of said plates.

HENRY C. PIERLE.